United States Patent

[11] 3,576,168

[72] Inventors Adam B. Thylstrup
Stockholm;
Per-Marcus Bergquist, Lidingo, Sweden
[21] Appl. No. 777,580
[22] Filed Nov. 21, 1968
[45] Patented Apr. 27, 1971
[73] Assignee Kenwood Manufacturing (Woking) Limited
[32] Priority Nov. 22, 1967
[33] Sweden
[31] 16035/67

[54] DEVICE FOR USE IN MACHINES FOR PREPARING DOUGHS AND SIMILAR COMPOSITIONS
2 Claims, 1 Drawing Fig.
[52] U.S. Cl. ............................................. 107/38
[51] Int. Cl. ............................................. A21c 1/14
[50] Field of Search ............................................. 107/30, 36, 38, 40; 259/126, 134; 31/36—41, 48

[56] References Cited
UNITED STATES PATENTS
527,033 10/1894 Webber ............................................. 107/38

Primary Examiner—Louis K. Rimrodt
Attorney—Fred Philpitt

ABSTRACT: A dough hook for a domestic mixing machine having mounted thereon a frustoconical guard which in use is positioned immediately under the driving head of the machine, the guard is rotatable with respect to the hook and is itself secured against rotation, this preventing dough moving outwardly and fouling the driving head.

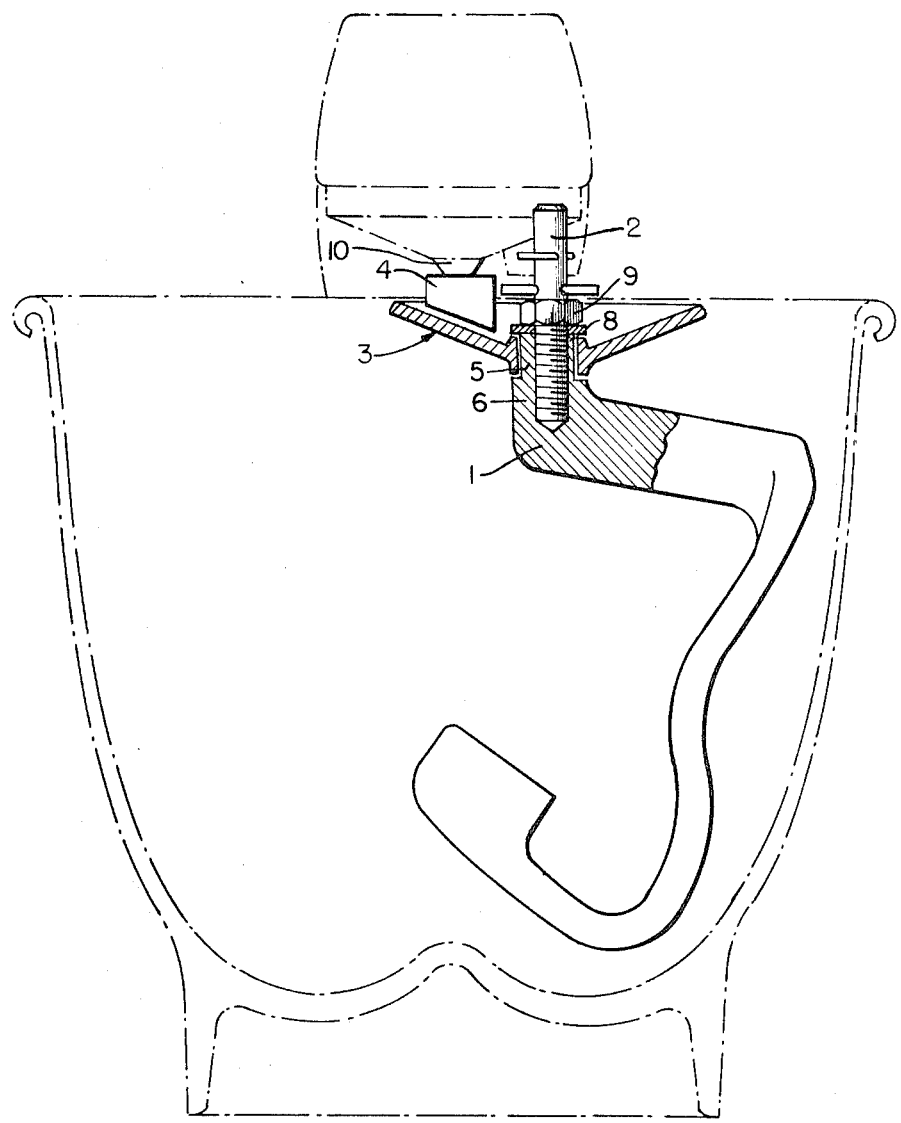

DEVICE FOR USE IN MACHINES FOR PREPARING DOUGHS AND SIMILAR COMPOSITIONS

The present invention relates to machines, particularly for domestic duties, for preparing doughs and similar compositions, said machines comprising a dough "hook" or similar mixing or kneading tool which under comparatively fast rotation relative to the bowl performs a circling movement in the bowl in which the dough or a similar composition is prepared. The circling movement is provided either by rotating the bowl around its axis while keeping the shaft of the dough hook stationary, said shaft being positioned at a distance from the axis of the bowl, or by circling the rotating tool in a closed path while keeping the bowl at rest.

Experience shows that when the tool in such machines is driven, the dough or similar composition has a tendency to climb up the tool and press into the driving mechanism thereof which, of course, is not desirable. To remedy this disadvantage it has been suggested to provide the dough hook, immediately below the fastening point, with a stop plate which is at rest in relation to the dough hook. This arrangement, however, has turned out not to be a completely satisfying solution of the problem. The dough sticks to the underside of the stop plate and follows the plate during its rotation and is thereby forced, under the influence of the centrifugal force, to creep further and further out towards and past the periphery of the plate to the top side of the plate and up to the driving mechanism which thus in spite of the presence of the stop plate will be affected.

This disadvantage has been eliminated or at least reduced according to the present invention by a modified arrangement of the stop plate. According to the invention said plate is rotatably mounted on the dough hook or other tool and arranged so that it does not follow the rotation of the kneading tool but rotates with respect to the latter. The dough sticking to the stop plate at the same time adheres to the bulk of dough on the dough hook and, therefore, the rotation of the dough hook in relation to the stop plate causes the dough to be torn away from the plate.

According to a preferred embodiment of the invention, the stop plate may be detachably rotatably mounted on the bearing pivot of the tool and is provided with a stop cooperating with a fixed stop on the machine, so as to prevent the stop plate from following the kneading tool when this is rotating. The stop plate and the kneading tool are preferably designed as a unit which is detachable from the machine.

In order that the present invention may be more readily understood, one embodiment thereof will now be described by way of example and with reference to the accompanying drawing which is a partially sectioned view of a device according to the invention.

On the drawing 1 designates a dough hook and 2 a drive shaft threaded into a hub part 6, of the dough hook and designed for inserting in and connecting to the driving shaft of the machine. A frustoconical disc-shaped stop plate coaxial with the kneading hook is designated 3. Said plate 3 is arranged in a reduced diameter part 5 of the hub part 6 so as to be freely rotatable, and is prevented from being axially movable thereon by a washer 8 and a lock nut 9 threaded onto drive shaft 2. The stop is formed with an axial lug 4" extending from the top inner face, said lug cooperating with a fixed stop 10 on the machine so that the stop plate 3 is prevented from rotation around its axis in relation to the machine. Thus, the dough hook 1 will rotate in relation to the fixed stop plate 3, resulting in that the dough which sticks to the underside of the stop plate and at the same time adheres the dough bulk on the rotating dough hook, is torn away from the stop plate before the dough has crept out to the periphery of the stop plate. Thus, the arrangement according to the invention of a stop plate and a dough hook rotating in relation thereto results in that the stop plate effectively prevents dough from getting in to the machine mechanism.

We claim:

1. For a mixing machine, a kneading tool comprising, in combination:
   a. a kneading portion;
   b. a drive shaft secured to said kneading portion and releasably attachable to said mixing machine;
   c. a frustoconical disc-shaped stop plate rotatably mounted on said kneading portion;
   d. an axial fin extending from the inner face of said stop plate to form an abutment effective to engage a stop on said mixing machine, to prevent rotation of said stop plate with said kneading portion; and
   e. means to lock said stop plate against axial movement with respect to said drive shaft, whereby said kneading tool and said stop plate form a single unit detachable from said mixing machine.

2. A kneading tool as claimed in claim 1, wherein said kneading portion comprising a hub part having a reduced diameter part, in which said drive shaft is threaded, wherein said stop plate is mounted on said reduced diameter part, and wherein a nut threaded onto said drive shaft retains said mounting sleeve on said hub portion.